No. 874,542. PATENTED DEC. 24, 1907.
C. W. RUSSELL.
APPARATUS FOR LIQUEFACTION AND PURIFICATION OF SEWAGE.
APPLICATION FILED JUNE 20, 1907.
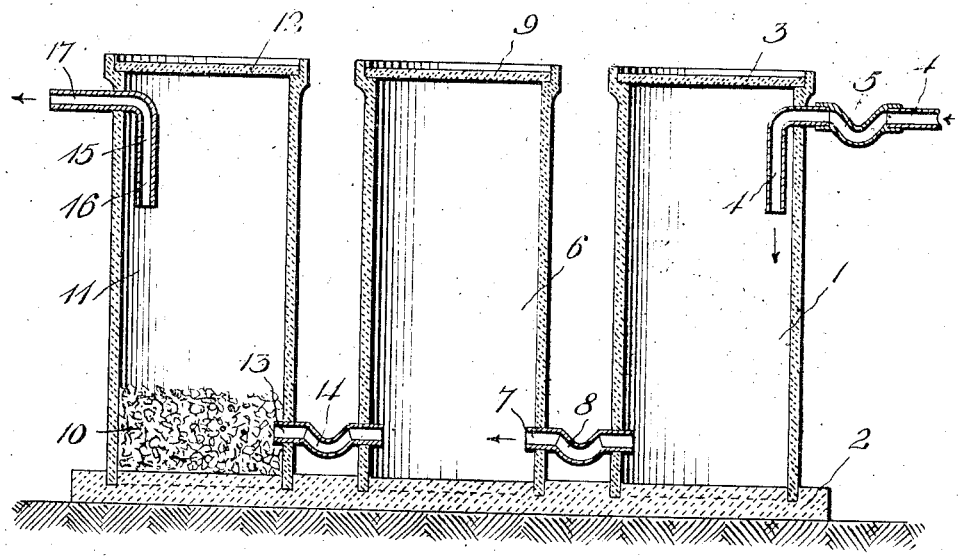
Witnesses
Inventor
Cornelius W. Russell
by H. B. Willson & Co.
Attorneys

UNITED STATES PATENT OFFICE.

CORNELIUS W. RUSSELL, OF BURLINGTON, IOWA.

APPARATUS FOR LIQUEFACTION AND PURIFICATION OF SEWAGE.

No. 874,542.　　　Specification of Letters Patent.　　　Patented Dec. 24, 1907.

Application filed June 20, 1907. Serial No. 379,932.

*To all whom it may concern:*

Be it known that I, CORNELIUS W. RUSSELL, a citizen of the United States, residing at Burlington, in the county of Des Moines and State of Iowa, have invented certain new and useful Improvements in an Apparatus for Liquefaction and Purification of Sewage; and I do declare the following to be a full, clear, and exact description of the invention, such as will enable others skilled in the art to which it appertains to make and use the same.

This invention has relation to new and useful improvements in apparatus for promoting the liquefaction and purification of sewage and has for its object to provide a simple and economical apparatus for automatically promoting the liquefaction and purification of sewage after being discharged from the house so that the same may be used for watering gardens or other purposes.

With the foregoing and other objects in view which will appear as the nature of the invention is better understood, the invention consists in certain novel features of construction, combination and arrangement of parts as will be hereinafter fully described and claimed.

In the accompanying drawings, the figure is a central longitudinal sectional view of the apparatus.

As shown in the accompanying drawings, 1 indicates a cell of vitreous, clay sewer pipe or other suitable material mounted in an upright position on the top and near one end of a suitable base 2 preferably of cement and having its upper open end covered or sealed by an air-tight cover 3 of cement or other suitable material. An inlet pipe 4 having a trap near its inner end communicates at said end with the upper end of said cell and at its opposite end with the house sewage.

In the operation of the invention, the sewage passes through the inner end of said pipe 4 to the cell 1, the solids covered with millions of bacteria falling to the bottom and the foul air from the sewage rising to the top of the cell. As soon as the pressure in said cell becomes sufficient by the foul air and discharge of sewage therein, the water in the sewage is forced into a second cell 6 also mounted on said base adjacent said cell 1 through a pipe 7 having a trap 8 which communicates at opposite ends with the lower end of said cell. Said cell 6 is also made from a piece of vitreous sewer pipe and is provided with an air-tight cover 9 of cement or other suitable material and it is in this cell that the bacteria are fed and kept alive by the accumulation of sewage and foul air from the cell 1. It is principally in this cell that the bacteria do their work of devouring all vegetable matter. As the solid material is gradually decomposed or broken up, bubbles of gas are formed which collect about the fragments and cause them to rise to the surface where a large portion of the gas escapes and the solid matter again sinks to the bottom of the cell. This rising and falling of the solid matter continues until it is entirely decomposed. During the decomposition of this matter, a scum begins to form on the surface of the water and it is then that the bacteria vigorously attack the solid matter and active decomposition begins. After a sufficient pressure has been generated in said cell 6 by the foul air and gas liberated through the decomposition of the solid matter, the effluent is caused to flow out of the cell 6 through a filter 10 preferably gravel in the lower end or bottom of a third cell 11, also in the form of a piece of vitrified sewer pipe or mounted on said base adjacent said cell 6 and having its upper end sealed or covered by an air-tight cover 12 of cement or other suitable material. Communication between the lower ends of said cells 6 and 11 respectively is established by means of a pipe 13 having a central trap 14.

15 indicates a siphon having a vertical downwardly extending inlet end 16 working in the upper end of said cell 11 and a horizontal outlet end 17. As the clear water or effluent rises in said cell 11 it compresses the air in the upper end thereof and after the water has risen to a point sufficiently above the inlet end 16 of the siphon, the compressed air forces the water through the siphon. This siphonage of the water continues until it is below the inlet end of the siphon when air rushes in the inlet end of the same and further discharge of the water from said cell is stopped until it has again arisen therein to a sufficient point above the inlet end of the siphon to create a sufficient pressure in the cell to cause it to again flow through the siphon.

Having thus described my invention, what I claim as new is:—

In an apparatus of the character described, a series of upright substantially air-tight cells, trapped pipes from one to the other of the cells at their lower ends for establishing communication therebetween, a trapped inlet communicating with the upper end of the first cell of the series, an outlet pipe communicating with the upper end of the last cell, the ends of said inlet and outlet pipes upon the interior of the cells depending toward the bottom of said cells, and a filter in the lower end of the last cell over the end of the trapped pipe at the bottom thereof.

In testimony whereof I have hereunto set my hand in presence of two subscribing witnesses.

CORNELIUS W. RUSSELL.

Witnesses:
T. W. KRIECHBAUM,
C. J. ARTZ.